(No Model.) 7 Sheets—Sheet 1.
W. G. MERRELL & C. W. CONKLIN.
STEAM GENERATOR.

No. 357,019. Patented Feb. 1, 1887.

WITNESSES:
INVENTORS.

(No Model.) 7 Sheets—Sheet 2.
W. G. MERRELL & C. W. CONKLIN.
STEAM GENERATOR.
No. 357,019. Patented Feb. 1, 1887.
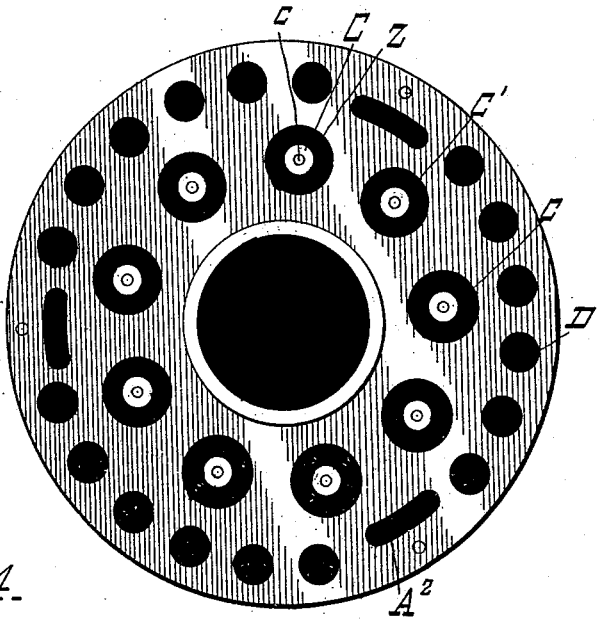
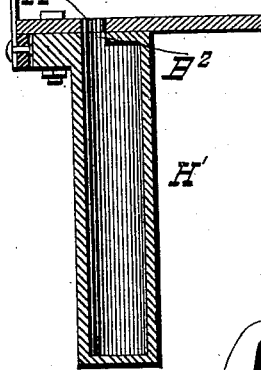
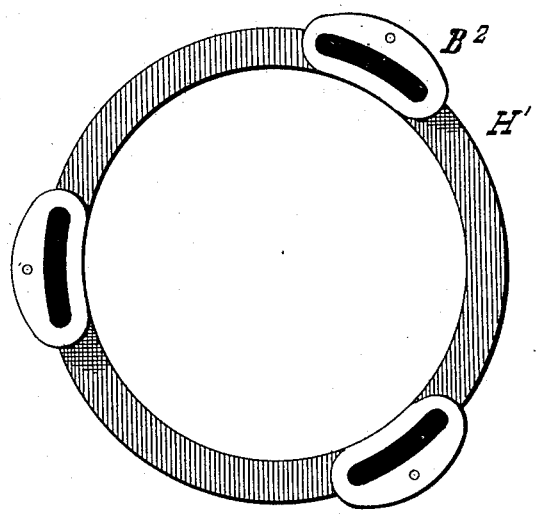
WITNESSES:
Jos. A. Ryan
H. G. Dieterich
INVENTOR.
William G. Merrell
Calvin W. Conklin
by Alex Mahon
Attorney (No Model.) 7 Sheets—Sheet 3.
W. G. MERRELL & C. W. CONKLIN.
STEAM GENERATOR.
No. 357,019. Patented Feb. 1, 1887.
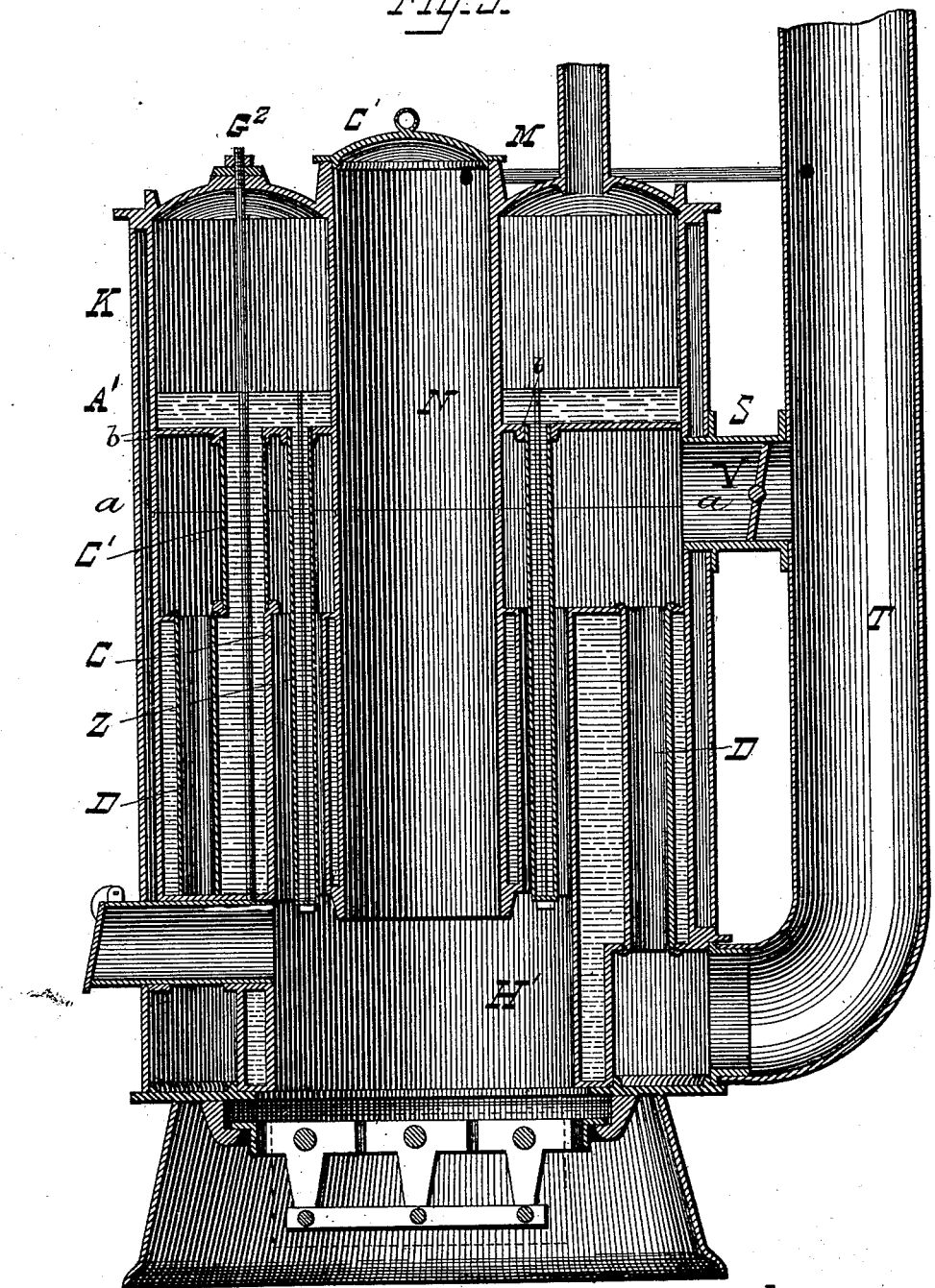
WITNESSES:
Jos. A. Ryan
H. G. Dieterich
INVENTORS.
William G. Merrell
Calvin W. Conklin
by Alex Mahon atty (No Model.) 7 Sheets—Sheet 4.

W. G. MERRELL & C. W. CONKLIN.
STEAM GENERATOR.

No. 357,019. Patented Feb. 1, 1887.

WITNESSES:
Jos. A. Ryan
H. T. Dieterich

INVENTOR.
William G. Merrell
Calvin W. Conklin
by Alex Mahon
Attorney

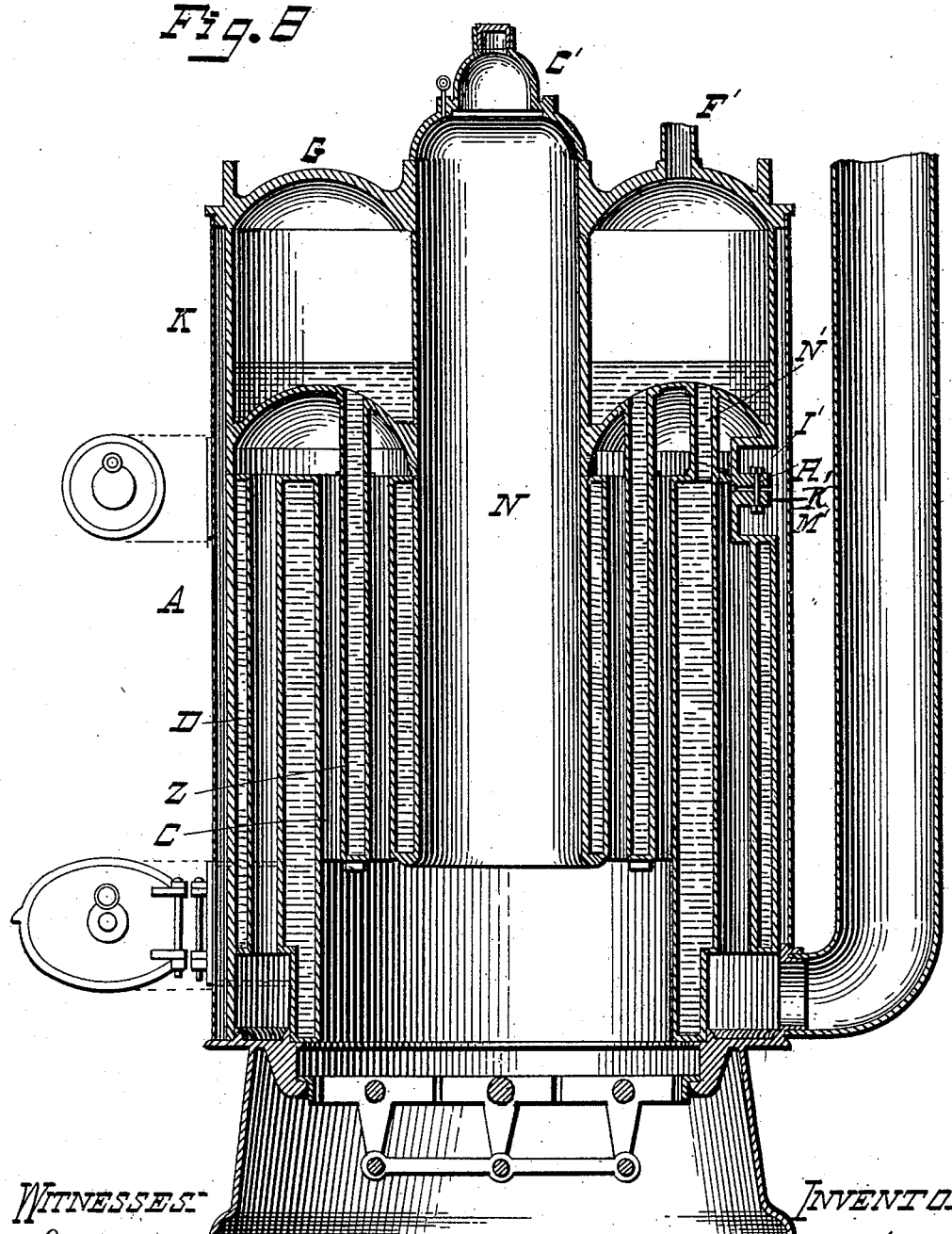

(No Model.) 7 Sheets—Sheet 6.
W. G. MERRELL & C. W. CONKLIN.
STEAM GENERATOR.
No. 357,019. Patented Feb. 1, 1887.
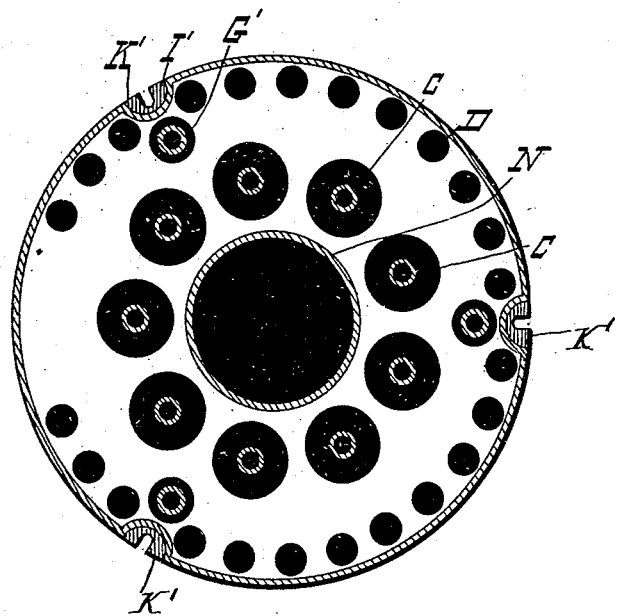

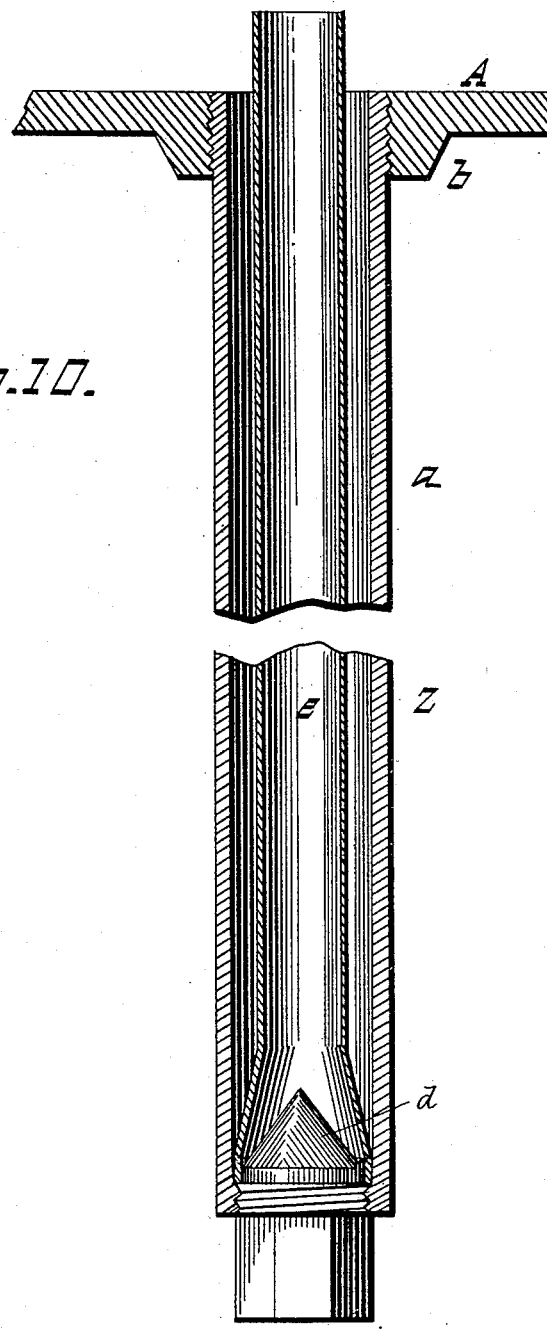

UNITED STATES PATENT OFFICE.

WILLIAM G. MERRELL AND CALVIN W. CONKLIN, OF AUBURN, NEW YORK.

STEAM-GENERATOR.

SPECIFICATION forming part of Letters Patent No. 357,019, dated February 1, 1887.

Application filed October 25, 1886. Serial No. 217,145. (No model.)

*To all whom it may concern:*

Be it known that we, WILLIAM G. MERRELL and CALVIN W. CONKLIN, both of the city of Auburn, county of Cayuga, State of New York, have invented certain new and useful Improvements in Steam-Generators, of which the following is a full and exact description, reference being had to the accompanying drawings, making part of this specification.

Our invention relates to certain improvements in steam-generators; and it has for its object to construct a boiler in sections that may be readily put together complete, as more fully hereinafter specified.

To this end our invention consists, first, in constructing the boiler proper with flues, combustion-chamber, and flanges to receive the boiler-plate complete in one piece; second, in constructing the fire-pot, lower part of the magazine, lower part of the outside shell, and the flues of said fire-pot complete and in one piece; third, in an improved construction of the drop-tubes extending through the combustion-chamber and escape-flues of the fire-space; fourth, in an improved construction of the upper and lower boiler-sections, whereby the two may be bolted together outside of said sections, but within the jacket, and to certain details of construction, all as hereinafter described.

Figure 1:
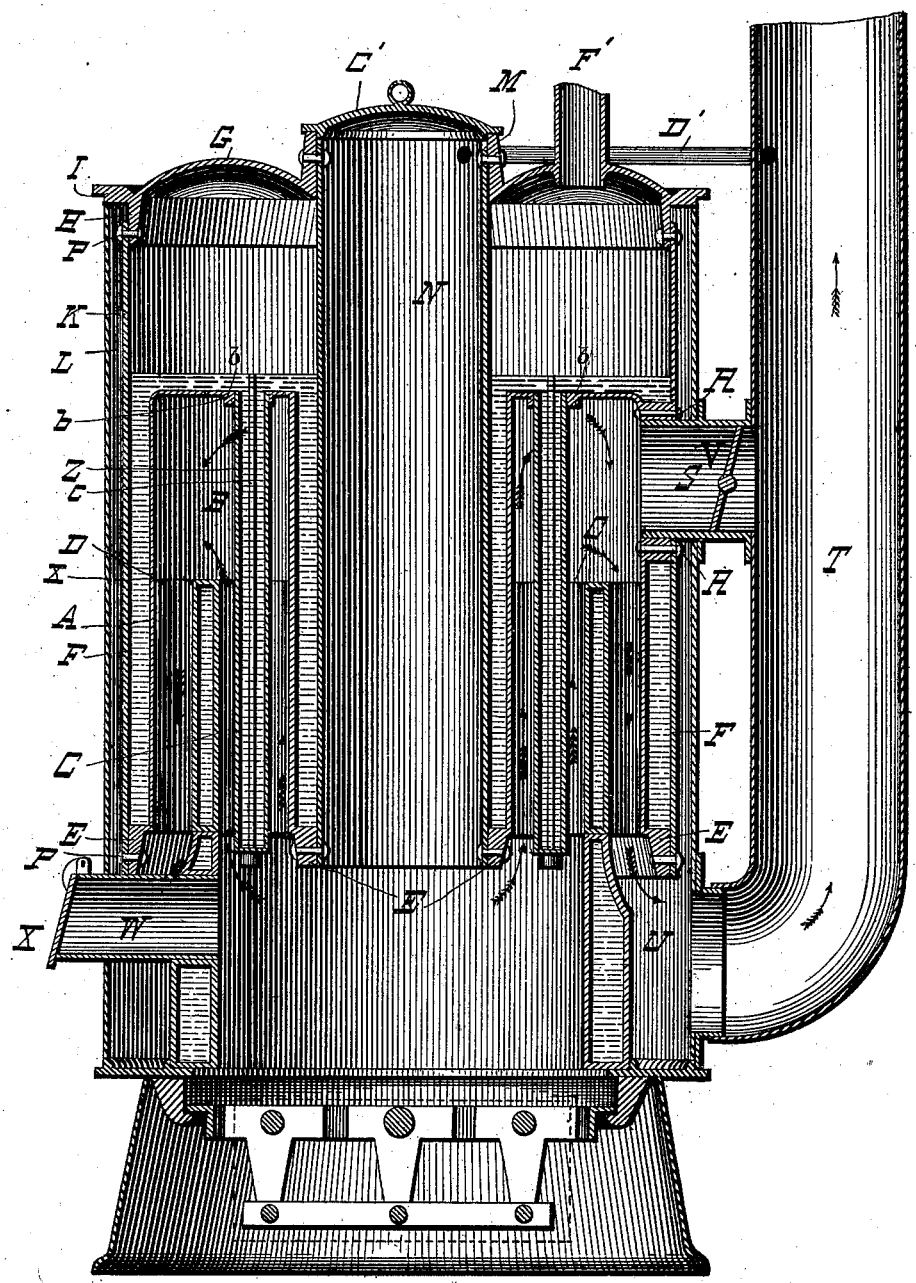
Figure 6:
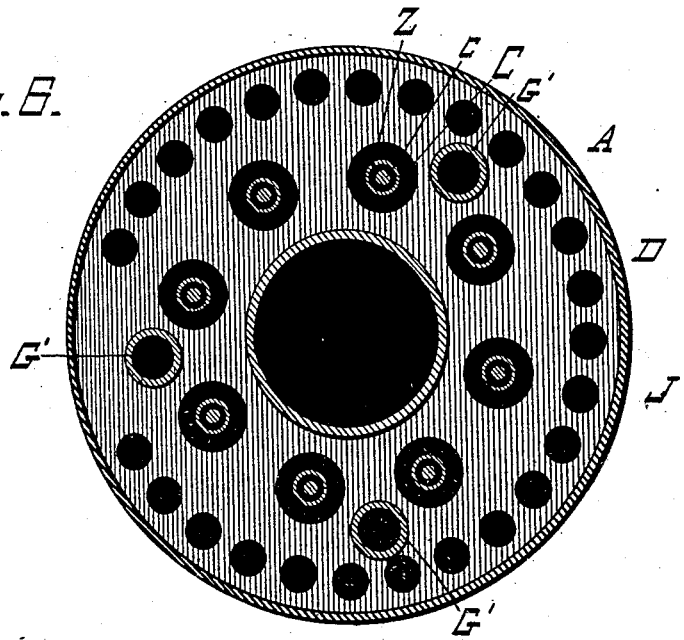
Figure 7:
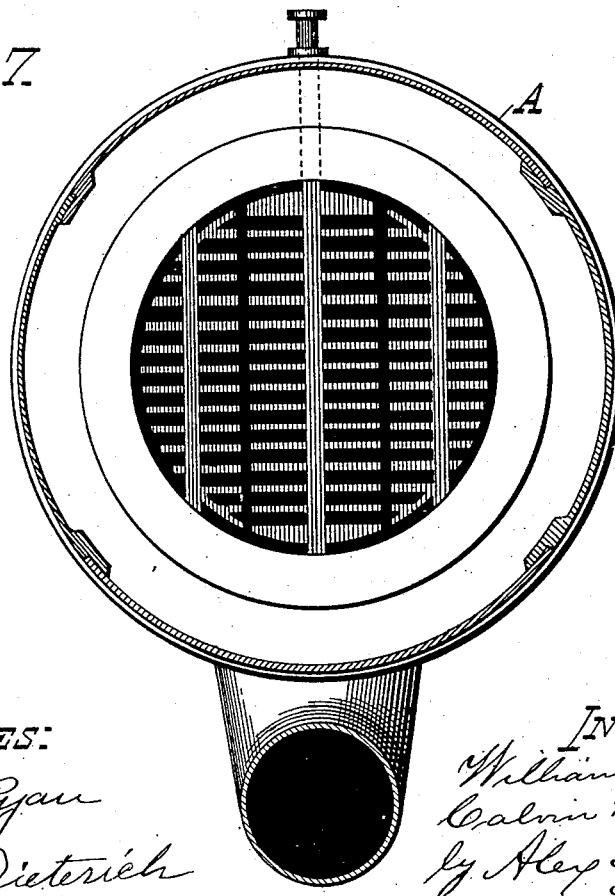

In the accompanying drawings, Figure 1 represents a vertical sectional view of our improved boiler complete; Fig. 2, a lower end view of the same, taken on the line $x$ $x$, Fig. 1; Fig. 3, a top view of the fire-pot; Fig. 4, a transverse vertical sectional view of a portion of the fire-pot; Fig. 5, a vertical sectional view showing a modification of our invention; Fig. 6, a sectional view of the lower end of the boiler, taken on the line $y$ $y$ of Fig. 5. Fig. 7 represents a view of the lower part of the fire-pot, showing the grate located therein. Fig. 8 represents a sectional view of the boiler-section having semi-cylindrical recesses and slotted lips on their outside, whereby the sections may be bolted together on the outside of the boiler, but inside of the jacket. Fig. 9 represents a sectional view taken on the line $z$ $z$, Fig. 8; and Fig. 10 is an enlarged sectional view of the drop-tube, to show the construction of the same.

The letter A indicates the inner section, of cast metal, containing the combustion-chamber B, the uptake and return flues C D, and the flanges E, for the connection of the shell F, complete in one piece.

G indicates the crown-plate, which is constructed of cast metal in one piece complete, having flanges H I, for the attachment of the outer shell, K, and the boiler-shell F, as more fully hereinafter specified. The said crown-plate is also provided with a central aperture having a vertical annular flange, M, for the attachment of the coal-magazine N.

The boiler-shell is secured to the respective flanges E and I by means of bolts or rivets P, and the magazine is similarly connected to the flanges M and E, as shown. The inner section, A, is provided with a flanged opening, as is also the boiler-casing, the casing being secured to the section A by means of bolts R.

S indicates a short flue leading from the said opening to the smoke-stack T, which extends from the lower annular flue, U, with which the return-flues connect. The flue S forms the direct draft from the furnace, and is provided with a damper, V, by means of which said draft may be cut off or controlled.

W indicates the opening through which the furnace is charged, which is provided with a door, X, by means of which it may be closed.

The grate of the furnace may be of any suitable construction, but is preferably of the form shown in Figs. 1, 5, 7, and 8; but as such grates constitute no part of the present invention a detailed description thereof is deemed unnecessary.

The letter Z indicates a series of drop-tubes, which are constructed each of an outer tube, $a$, of about one and one-fourth inch diameter and about one-eighth of an inch thickness. The upper end of each tube is screw-threaded, as shown, so as to fit in an internally-screw-threaded boss, $b$, by which it is secured in place. Inside of said tube is a smaller tube, $c$, of Russia stove-pipe iron, which is of less diameter, and extends upward into the steam-space of the boiler. The lower part of the inner tube is split, and is secured in the lower end of the outer tube by means of a plug, $d$, as shown in Fig. 10, which spreads it out to the full internal diameter of the outer tube, the whole being welded so as to make a tight joint and secure fastening. The plug is made of sufficient length to be forged into a square or polygonal head, e, which will receive a wrench, by means of which the drop-tube may be secured to or removed from its seat conveniently.

The letter C' indicates the cover of the coal-magazine, and D' a small pipe extending from the magazine to the smoke-stack, to carry off any gases generated in the magazine.

The letter F' indicates the exhaust-pipe extending from the boiler to the engine, radiator, or other device to which the steam is to be supplied.

In the modification shown in Fig. 5 the boiler A' is constructed in two parts, which are joined on the line a. The upper part is cast with the crown-plate and upper portion of the outer shell, forming the upper water-space and steam-space and the upper portion of the magazine complete in one piece. These parts are provided with tubes G', through which extend through-bolts G², which secure the upper and lower portions of the boiler-sections together. The lower boiler-section in the modification, with its water spaces and flues, and the fire-pot H' and its corresponding flues and water-spaces, are cast integral or in one piece with each other, as also the lower portion of the magazine. In the said modification, although the return-flues may form a part of either cast section, they are preferably made of detached tubes of wrought-iron, which are expanded to connect them with the boiler in the usual manner for securing such tubes.

In the modification shown in Figs. 8 and 9 of the drawings the upper and lower sections of the boiler, on the outside, at suitable intervals of their adjoining edges, are provided with semicircular recesses I' and slotted lips K', which latter are secured together by suitable bolts, M', thus connecting the sections on the outside of the boiler, but within the jacket. The upper part of the combustion-chamber in this case is made rounded on top, and the two sections are connected on the outside, dispensing with the bolts passing through the water-tubes, the bolts, however, being within the jacket. In this instance the upper section of the boiler is also cast with an extension, N', which extends down through the combustion-chamber and connects the two parts of the boiler, thus securing the full effective heat of the furnace, which would not be the case if the connection were made outside of the boiler, as the heat will pass on all sides of said connection.

In the respective forms of the boiler the fire-pot section is provided with water-passages B², to connect with similar passages, A², in the boiler-section, as shown in Fig. 4, in order to connect the water-space of the boiler with the water-space around the fire-box.

The draft through the flues is indicated by arrows in Fig. 1, and takes a similar course in the modifications shown in Figs. 5 and 8.

Having now described our invention, we claim—

1. A boiler-section constructed in one piece, of cast metal, having the flues, combustion-chamber, and flanges to receive the boiler-shell complete, substantially as described.

2. A boiler constructed in two parts, of cast metal, consisting of an upper and lower section, with the combustion-chamber formed in both sections and the flues formed with the lower section, substantially as described.

3. The boiler formed of an upper and lower cast section, in combination with a series of return-flues connected with the lower section, substantially as described, and for the purpose set forth.

4. The combination, with the upper and lower boiler-sections, of the water-tubes and the bolts located within the outer shell of the boiler for securing the two sections together, substantially as described.

5. The combination, with the lower cast boiler-section, constructed substantially as described, of the fire-pot formed or cast in one piece with said lower section, flues, water-passages, and spaces, as set forth.

6. A boiler consisting of an upper and lower section, having the recesses and slotted lips at their adjoining edges, in combination with the bolts for connecting the sections together, substantially as specified.

7. The upper section of boiler having the combustion-chamber and steam-space cast in one piece, and having an extension formed with the upper portion thereof to extend down through the combustion-chamber, substantially as and for the purpose set forth.

8. A boiler formed of an upper and lower section, in combination with the drop-tubes consisting of two concentric tubes, the outer ones having screw-threads by which they may be secured in bosses in the boiler to one of said sections, and the inner ones split at their lower ends and secured by means of welded plugs having wrench-heads at their lower ends, whereby said drop-tubes may be readily secured to or removed from the boiler, substantially as described.

WILLIAM G. MERRELL.
CALVIN W. CONKLIN.

Witnesses:
FRANK E. CADY,
LEWIS PADDOCK.